(12) United States Patent
Mercier

(10) Patent No.: US 9,889,698 B2
(45) Date of Patent: Feb. 13, 2018

(54) SECURE LAMINATE WITH SECURITY FEATURE ON THE EDGE

(71) Applicant: ASSA ABLOY AB, Stockholm (SE)

(72) Inventor: Frantz Mercier, Hollister, CA (US)

(73) Assignee: ASSA ABLOY AB, Stockholm (SE)

( * ) Notice: Subject to any disclaimer, the term of this patent is extended or adjusted under 35 U.S.C. 154(b) by 40 days.

(21) Appl. No.: 14/425,072

(22) PCT Filed: Aug. 21, 2013

(86) PCT No.: PCT/US2013/055960
§ 371 (c)(1),
(2) Date: Mar. 2, 2015

(87) PCT Pub. No.: WO2014/035757
PCT Pub. Date: Mar. 6, 2014

(65) Prior Publication Data
US 2015/0224811 A1    Aug. 13, 2015

(30) Foreign Application Priority Data
Sep. 3, 2012    (CH) ...................................... 1565/12

(51) Int. Cl.
*B42D 25/378*    (2014.01)
*B42D 25/29*    (2014.01)
(Continued)

(52) U.S. Cl.
CPC .......... *B42D 25/378* (2014.10); *B32B 27/365* (2013.01); *B32B 37/18* (2013.01);
(Continued)

(58) Field of Classification Search
CPC .... B42D 25/378; B42D 25/29; B42D 25/351; B42D 25/387; B42D 25/45; B42D 25/475;
(Continued)

(56) References Cited

U.S. PATENT DOCUMENTS 7,544,266 B2 *    6/2009   Herring ................. B32B 38/145
156/277
2004/0007324 A1   1/2004   Henn et al.
(Continued)

FOREIGN PATENT DOCUMENTS

EP    1780041    5/2007
FR    2840094    11/2003
(Continued)

OTHER PUBLICATIONS

International Search Report and Written Opinion for International (PCT) Patent Application No. PCT/US2013/055960, dated Feb. 7, 2014 9 pages.
(Continued)

*Primary Examiner* — Laura C Powers
(74) *Attorney, Agent, or Firm* — Sheridan Ross P.C.

(57) ABSTRACT

A laminate structure along with one or more security features is disclosed. The laminate structure may correspond to an identification document, such as an identification card, and may include a core layer with one or more security elements established thereon. As light is emitted into the core layer, the light impacts one or more of the security elements and is re-radiated back out of the core layer, thereby providing an indication that the laminate structure includes the security elements and is, therefore, authentic.

17 Claims, 5 Drawing Sheets

(51) Int. Cl.
- *B42D 25/351* (2014.01)
- *B42D 25/475* (2014.01)
- *B42D 25/387* (2014.01)
- *B42D 25/45* (2014.01)
- *B32B 37/18* (2006.01)
- *B32B 38/00* (2006.01)
- *B32B 27/36* (2006.01)
- *B44F 1/00* (2006.01)
- *G07D 7/12* (2016.01)
- *B44F 1/10* (2006.01)

(52) U.S. Cl.
CPC ........ *B32B 38/0004* (2013.01); *B32B 38/145* (2013.01); *B42D 25/29* (2014.10); *B42D 25/351* (2014.10); *B42D 25/387* (2014.10); *B42D 25/45* (2014.10); *B42D 25/475* (2014.10); *B44F 1/10* (2013.01); *G07D 7/12* (2013.01); *B32B 2255/10* (2013.01); *B32B 2307/412* (2013.01); *B32B 2307/414* (2013.01); *B32B 2307/422* (2013.01); *B32B 2425/00* (2013.01); *Y10T 156/1052* (2015.01)

(58) Field of Classification Search
CPC ... B32B 27/365; B32B 37/18; B32B 28/0004; B32B 28/145; B32B 2255/10; B32B 2307/412; B32B 2307/414; B32B 2307/422; B32B 2425/00; B44F 1/10; G07D 7/12; Y10T 156/1052
See application file for complete search history.

(56) References Cited

U.S. PATENT DOCUMENTS

| | | |
|---|---|---|
| 2005/0087606 A1 | 4/2005 | McCumber |
| 2007/0119950 A1 | 5/2007 | Auslander et al. |
| 2007/0128972 A1* | 6/2007 | Schmidt ................ A63H 33/22 446/219 |
| 2010/0252637 A1 | 10/2010 | Bouchard |
| 2010/0253062 A1 | 10/2010 | Hardwick et al. |
| 2011/0031316 A1 | 2/2011 | Morrill-Webb et al. |
| 2011/0123766 A1* | 5/2011 | Sakagami ............... B32B 27/08 428/141 |

FOREIGN PATENT DOCUMENTS

| | | |
|---|---|---|
| JP | H02-76796 | 3/1990 |
| JP | H06-309519 | 11/1994 |
| WO | WO 2004/104913 | 12/2004 |
| WO | WO 2005/043456 | 5/2005 |
| WO | WO 2008/110892 | 9/2008 |
| WO | WO 2009/106305 | 9/2009 |
| WO | WO 2010/006805 | 1/2010 |
| WO | WO 2011/070122 | 6/2011 |
| WO | WO 2011/147520 | 12/2011 |

OTHER PUBLICATIONS

International Preliminary Report on Patentability for International (PCT) Patent Application No. PCT/US2013/055960, dated Mar. 12, 2015 7 pages.

Extended Search Report for European Patent Application No. 13832459.5, dated Mar. 24, 2016 9 pages.

* cited by examiner

SECURE LAMINATE WITH SECURITY FEATURE ON THE EDGE

CROSS REFERENCE TO RELATED APPLICATION

This application is a national stage application under 35 U.S.C. 371 of PCT Application No. PCT/US2013/055960 having an international filing date of Aug. 21, 2013, which designated the United States, which PCT application claimed the benefit of Swiss Application Serial No. CH 01565/12, filed Sep. 3, 2012, both of which are incorporated by reference in their entirety.

FIELD OF THE DISCLOSURE

The present disclosure is generally directed toward security features and more particularly toward security features in laminates.

BACKGROUND

Identification documents are often used to prove one's identity to strangers or security personnel. In such a situation, the stranger or security personnel is left to assume that the identification document is authentic (i.e., it was produced by a reputable or trusted third-party and it properly identifies the holder of the document). Clearly, the possibility of counterfeit identity documents exists and, as such, the need to combat such counterfeiting is needed, especially if such documents are relied upon for security or access control purposes.

Well-known counterfeit countermeasures exist such as holograms. Indeed, when holograms were first introduced, they effectively prohibited counterfeit identification documents. However, counterfeiting operations have evolved in their complexity to keep up with the countermeasures. Accordingly, the need exists to continue developing counterfeiting countermeasures (e.g., security features) for identification documents and other objects that carry an inherent level of trust.

Identification documents in the form of identification cards (e.g., passports, Secure cards, etc.) are used in a wide array of applications including access control, identification, and financial transfer applications. Such cards vary in complexity and features. Some cards can store digital information and may include embedded Radio Frequency Identification (RFID) systems, a magnetic strip, optically recordable features or an electronic chip. Secure cards typically consist of a laminate structure including various plastic lamellae and layers, which carry information (e.g., alphanumeric information, logos, and/or a picture of the card holder). As can be appreciated, the security features for these identification cards and laminate structures vary in complexity, cost, and ease of manufacture.

One counterfeit countermeasure approach involves integrating one or more security features with the edge of the card or laminate structure. Typical edge security features include placing special components along the perimeter edge of a card by perforating, printing, or etching directly on the edge of the card. These approaches require modification to individual cards after mass production. Generally, such individual post-production marking approaches are complex and, therefore, cost-prohibitive.

One example of an edge security feature is described in WO2011/070122, the entire contents of which are hereby incorporated by reference. The '122 publication describes configuring a laminated document with a series of holes near an edge of the document. The holes are filled with various colored materials. The colored materials may be transparent, translucent or opaque. By viewing the card edge, tampering or counterfeiting may be detected. Although effective in detecting tampering or counterfeiting, the '122 security feature is not particularly cost-effective from a manufacturing perspective.

WO 2008/110892, the entire contents of which are hereby incorporated herein by reference, discloses a secure identification document comprising two constitution layers, wherein one edge of the identification document is marked with written data etched into the edge by a laser beam. The written data overlap with the constitution layers, to prevent fraudulent document delaminating. The '892 publication is also deficient in that is requires processing the edge of the document directly, which again is cost-prohibitive, difficult, and time-consuming from a manufacturing perspective.

US 2005/087606, the entire contents of which are hereby incorporated herein by reference, discloses a card having non-visible or visible communication markings printed on a perimeter edge surface of a card using an ink jet printer. The markings, e.g. lines of a barcode, are printed on the longest side of the perimeter edge. Much like other prior art references described herein, the '606 publication cannot be implemented very easily or cheaply as it requires printing directly on the perimeter edge.

SUMMARY

It is, therefore, one aspect of the present disclosure to provide a more cost-effective mechanism for producing identification documents (e.g., identification cards) and other laminate structures which have one or more security features. More specifically, embodiments of the present disclosure utilize one or more security elements positioned on or near a transparent or translucent core layer of a laminate structure as a security feature. The security elements may correspond to security ink, or more specifically an Ultraviolet (UV) or photoluminescent ink that is printed on the core layer and/or a layer that is adjacent to the core layer. In some embodiments, the security elements may be positioned at or near one or more peripheral edges of the core layer, thereby minimizing the element's impact on lamination between the core layer and adjacent layers. However, the security elements may still be printed on the major surface of the core or adjacent layer, thereby obviating the need to perform post-production marking of the edges.

Because the core layer may be transparent or translucent, light is allowed to enter the laminate structure and impact one or more of the security elements. Light is then re-radiated by the security elements back into the core layer and eventually exits the core layer to enable visual confirmation that the laminate structure includes the security element(s).

In one embodiment, a laminate structure is provided, the laminate structure comprising:
  a core layer comprising at least one of a transparent or translucent material including:
    a first major surface;
    a second major surface opposing the first major surface; and
    at least one edge connecting the first and second major surfaces;
  a second layer adjacent to the first major surface of the core layer; and
  a security element comprising a photoluminescent material laminated between the core layer and the second layer such that the presence of the security element can be checked by illuminating the at least one edge and viewing and the re-radiated luminescent light emerging from the core layer through the at least one edge.

As used herein, the term "re-radiated" and "re-radiating" may be used interchangeably to refer to any amount of light produced by a photoluminescent material in response to that material being illuminated with a first type of light. The photoluminescent material may be configured to "re-radiate" a second type of light in response to illumination with the first type of light where the second type of light has at least one different property as compared with the first type of light. Thus, "re-radiated" light may correspond to light that has reflected off the photoluminescent material and had one or more of its light properties changed as a result of the interaction with the photoluminescent material.

It is another aspect of the present disclosure to incorporate the laminate structure in an identification document or identification card. Thus, counterfeiting of the identification document or identification card is made significantly more difficult.

It is still another aspect of the present disclosure to provide a method for manufacturing a secure laminate structure, the method comprising:
  providing a core layer comprising one of a transparent and translucent material comprising a first major surface, a second major surface opposing the first major surface, at least one edge connecting the first and second major surfaces;
  providing a second layer;
  creating a security element by printing a photoluminescent ink on at least one of the first major surface of the core layer and on a surface of the second layer;
  collocating the core layer and the second layer such that the security element is positioned therebetween; and
  laminating the core layer and the second layer to create a combined laminated sheet.

The present disclosure will be further understood from the drawings and the following detailed description. Although this description sets forth specific details, it is understood that certain embodiments of the invention may be practiced without these specific details.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
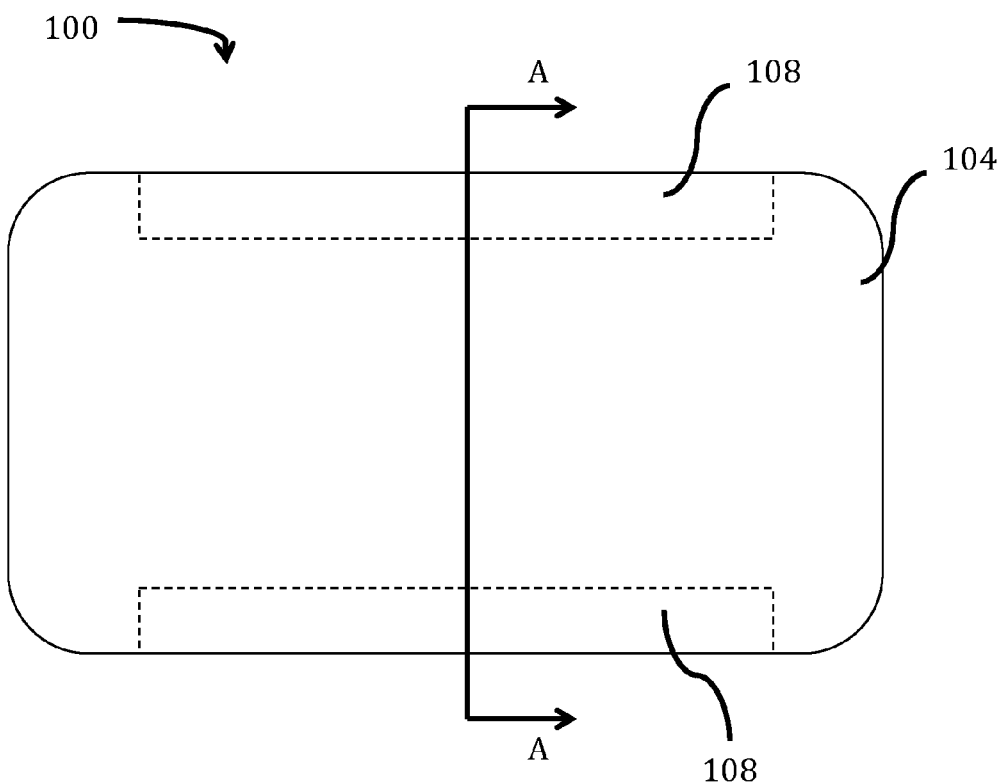
Figure 2:
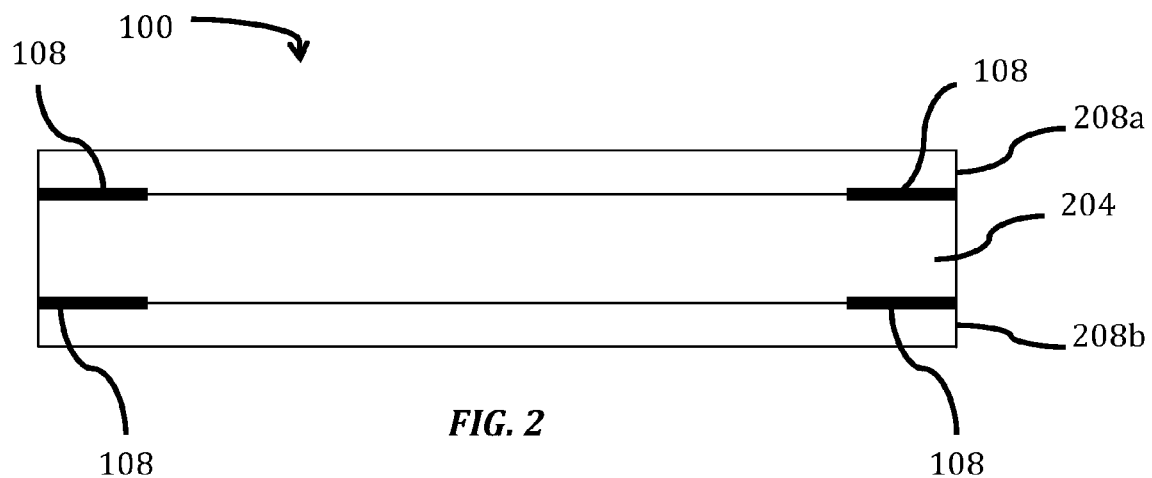
Figure 3:
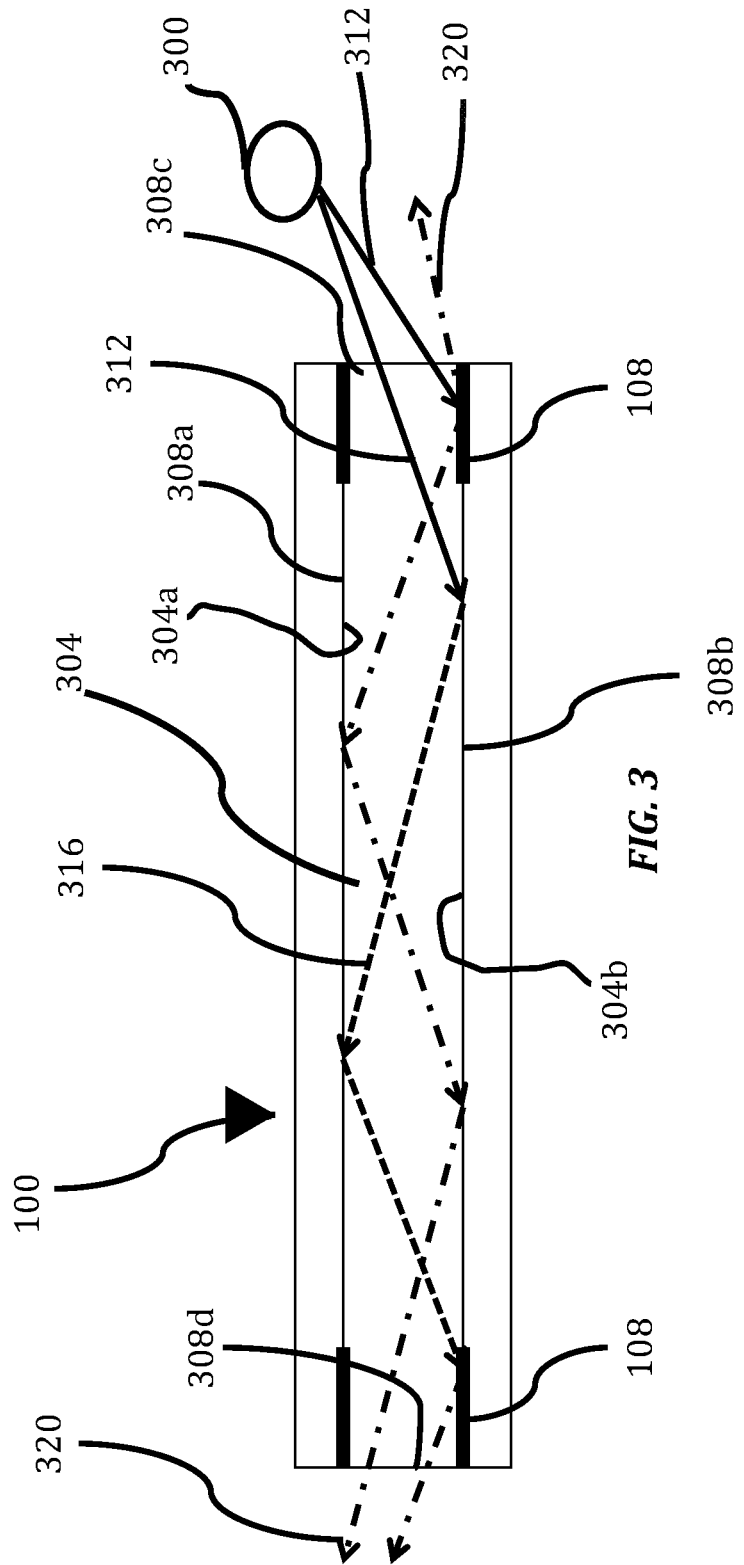
Figure 4:
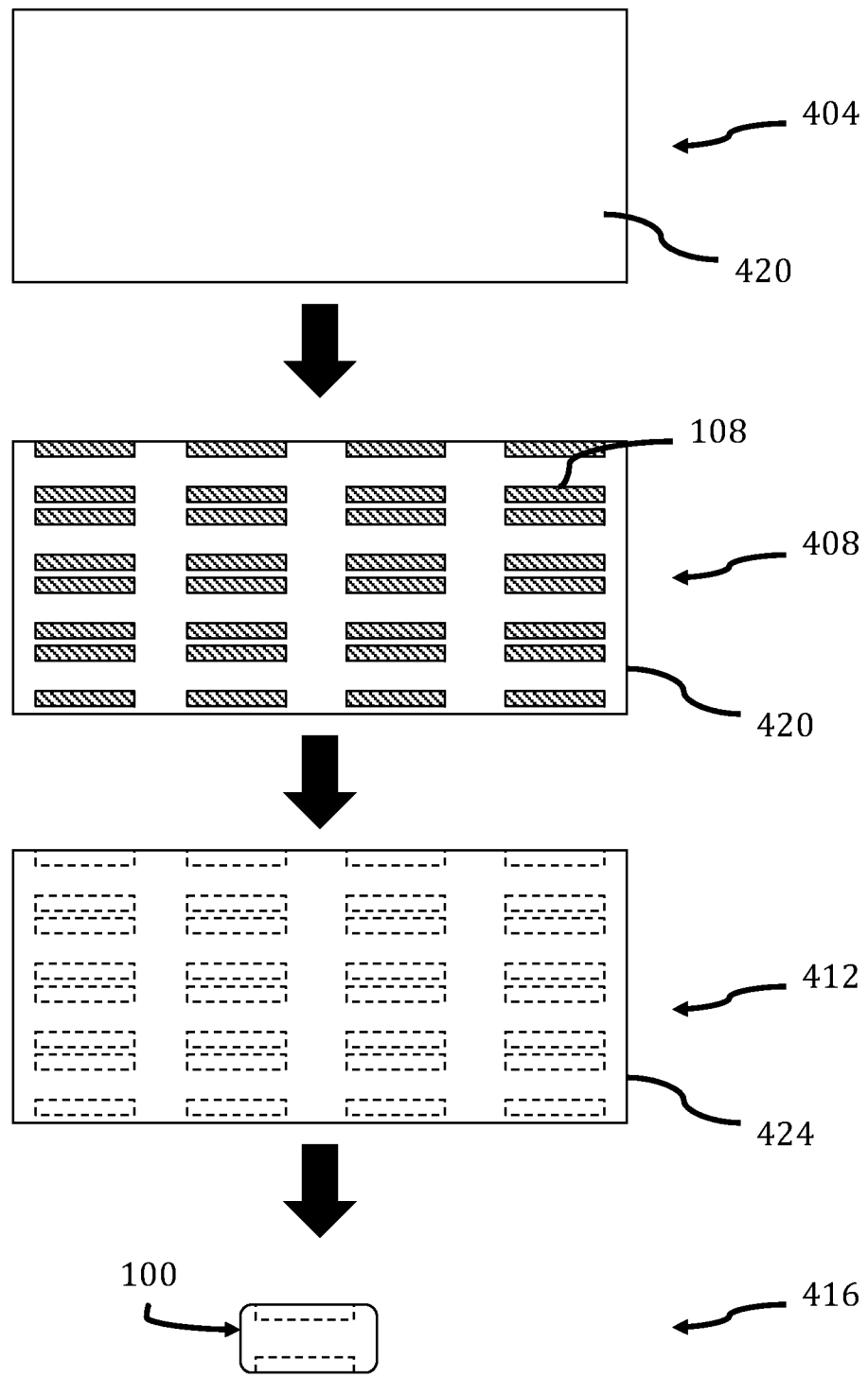
Figure 5:
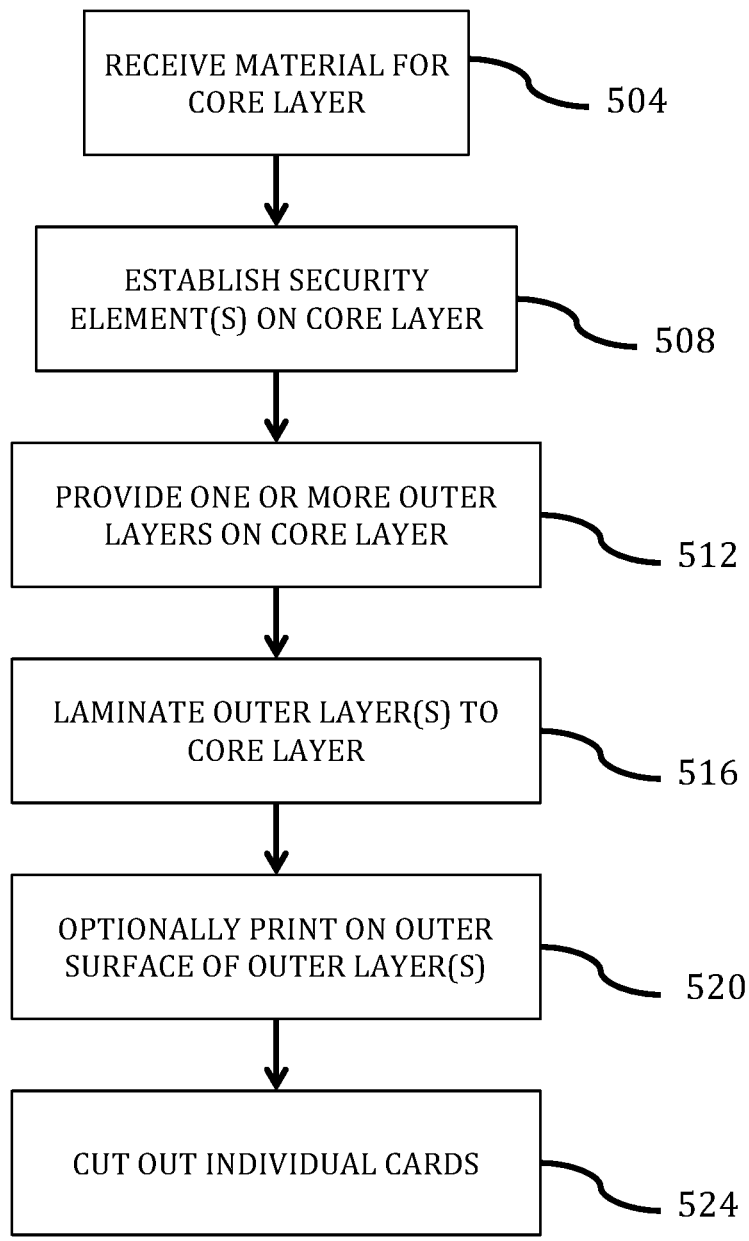
Figure 6:
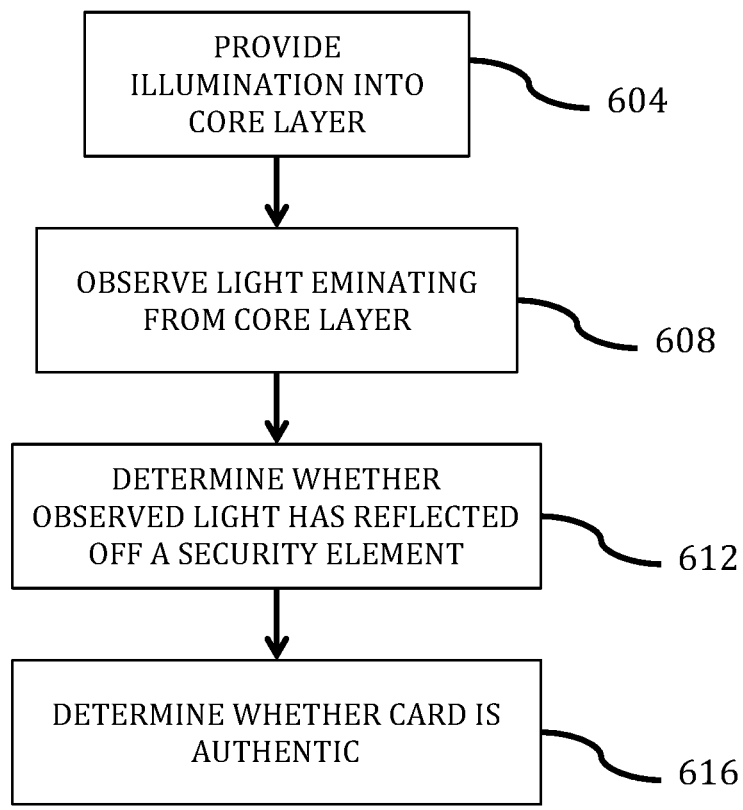

The present disclosure is described in conjunction with the appended figures:

FIG. 1 is a top view of an identification document in accordance with embodiments of the present disclosure;

FIG. 2 is a cross-sectional view along line A-A depicted in FIG. 1;

FIG. 3 is a cross-sectional view along line A-A further depicting a core layer being illuminated in accordance with embodiments of the present disclosure;

FIG. 4 depicts a process for producing a plurality of identification documents simultaneously in accordance with embodiments of the present disclosure;

FIG. 5 is a flow chart depicting a method of manufacturing identification documents in accordance with embodiments of the present disclosure; and FIG. 6 is a flow chart depicting a method of authenticating an identification document in accordance with embodiments of the present disclosure.

DETAILED DESCRIPTION

With reference now to FIGS. 1-6, security features for laminate structures, methods of producing laminate structures, and authentication methods will be described. While the description and figures are generally directed toward security features in laminate structures, it should be appreciated that embodiments of the present disclosure are not so limited. Moreover, while specific examples will be described in connection with laminated identification documents, it should be appreciated that the concepts disclosed herein can be utilized in other laminated and non-laminate structures and do not necessarily have to be applied to identification documents.

With reference initially to FIGS. 1 and 2, a laminate structure 100, such as an identification document, is shown. The laminate structure 100 is depicted as being in card form, but it should be appreciated that the laminate structure may be larger or smaller than a traditional identification card. The laminate structure 100 is shown to include a card body 104 with one or more security elements 108 incorporated therein. In some embodiments, the security elements 108 are provided on an inner layer of the card body 104 such that they are not visible from the top or bottom, but may be visible from a side view of the card body 104.

FIG. 2 depicts further details of the construction of the laminate structure 100. In some embodiments, the laminate structure 100 comprises a core layer 204 with one or more adjacent outer layers 208a, 208b. Although the core layer 204 is shown as having a thickness greater than either of the outer layers 208a, 208b, it should be appreciated that embodiments of the present disclosure are not so limited. Likewise, the outer layers 208a, 208b do not necessarily need to exhibit the same thickness. In fact, one or both of the outer layers 208a, 208b may have different thicknesses from one another. Furthermore, the thickness of each layer and the relative thicknesses of each layer should not be construed as being limited to any particular dimension. As a non-limiting example, however, entire laminate structure 100 may comprise dimensions in accordance with standard ISO 7816, the content of which is incorporated herein by reference. In such an embodiment, entire laminate structure 100 may comprise a thickness of approximately 0.8 mm, the core layer 204 may comprise a thickness between approximately 0.2 mm and 0.6 mm, and each of the outer layers 208a, 208b may comprise a thickness between approximately 0.1 mm and 0.4 mm. In embodiments where the laminate structure 100 is utilized as an identification document in the form of a card, the surface area of each layer 204, 208a, 208b is the same, thereby creating a laminate structure 100 with a single uniform edge.

The core layer 204 may correspond to a plastic, polymer, or composite material that is transparent or translucent in nature. As one non-limiting example, the core layer 204 may correspond to or comprise a clear sheet of Polycarbonate (PC). Of course, any other material that is useful in lamination operations and also exhibits transparent or translucent properties may be utilized.

The outer layers 208a, 208b do not necessarily have to be constructed of the same material, although they can be constructed of the same material. As a non-limiting example, the outer layers 208a, 208b may be constructed of an opaque sheet of plastic or polymer. More specific examples of materials that may be used to construct the outer layers 208a, 208b include, without limitation, Polyvinyl Chloride (PVC), Polyethylene Terephtalate (PET), or the like. Alternatively or additionally, the outer layers 208a, 208b may correspond to a transparent or translucent material, but they may have a surface coated with a reflective material. For instance, the major surface of an outer layer 208a, 208b that interfaces with the core layer 204 may be treated with a reflective coating, thereby enabling the outer layer 208a, 208b to contain and reflect light within the core layer 204. The essential feature is that the material of the outer layers 208a and/or 208b is chosen such that its opacity/reflective coefficient by the wave-length of the re-radiated luminescent light from the security element is so high that it insure that most of the said re-radiated light will reflect inside the core layer 204 until finally exit through the edge of the said core layer 204. Ideally, the outer layers 208a and/or 208b are also opaque/reflective to the light of illuminating source.

Although only three layers 204, 208a, 208b are depicted in the laminate structure 100, it should be appreciated that a greater or lesser number of layers of material may be used without departing from the scope of the present disclosure. Indeed, the laminate structure 100 may simply comprise a core layer 204 and a single outer layer 208a or 208b. Alternatively, the laminate structure 100 may comprise four, five, six, . . . , twenty, or more layers where one or more of the layers is substantially transparent or translucent and another layer adjacent to the transparent or translucent layer is configured to contain or reflect light within the transparent or translucent layer.

The security element(s) 108 are shown as being situated between the core layer 204 and the outer layers 208a, 208b. In some embodiments, the security element(s) 108 may correspond to a photoluminescent ink or the like. Specifically, the security element(s) 108 may be configured to be printed on a major surface of either the core layer 204 or an outer layer 208a, 208b so that it is exposed to the transparent or translucent core layer 204 when the laminate structure 100 is finally laminated. In some embodiments, the security element(s) 108 are used as a verification of authenticity for the laminate structure 100. In some embodiments, the security element(s) 108 may actually be used as detection marks to facilitate or indicate production steps previous to lamination or die cutting.

As will be discussed in further detail herein, the security element(s) 108 are provided between the major surface of the core layer 204 and an outer layer 208a, 208b, which means that the security element(s) 108 can be established during batch production of the laminate structures 100 instead of after the laminate structures 100 have been cut into card-shaped structures (e.g., die cut). This means that a laminate structure 100 can be manufactured with security element(s) 108 at a relatively low cost. Advantageously, however, the security element(s) 108 can be made readily visible on the edge of the laminate structure 100. In particular, the security element(s) 108 may be provided or printed at the farthest edge of the core layer 204 and/or outer layer 208a, 208b and since the core layer 204 is at least one of transparent or translucent, the security element(s) 108 can be viewed by looking at the edge of the laminate structure 100. Another advantage to placing the security element(s) 108 at the periphery of the laminate structure 100 is that the security element(s) 108 can have a minimal impact on the lamination between the core layer 204 and the outer layers 208a, 208b if the security element(s) 108 are situated at the edges of the laminate structure 100.

While the security element(s) 108 are depicted and described as corresponding to photoluminescent ink that can be printed onto the core layer 204 or outer layer 208a, 208b, it should be appreciated that embodiments of the present disclosure are not so limited. In particular, the security element(s) 108 may actually correspond to a strip of material, film, or tape whose thickness is less than or equal to a thickness of the core layer 204 and/or outer layers 208a, 208b. In other words, the security element(s) 108 may actually exhibit structural properties instead of being ink that is printed on the major surface of the core layer 204, for example. Where the security element(s) 108 correspond to a strip of material, film, or tape, the entire structure may be photoluminescent or, in alternative embodiments, one or more surfaces of the structure may be treated with a photoluminescent material. If the security element(s) 108 further exhibit a thickness that needs to be accommodated during lamination, then the core layer 204 and/or outer layers 208a, 208b may be etched, cut, or grinded to create a cavity that receives the security element(s) 108, thereby enabling a finished laminate structure 100 of substantially uniform thickness.

With reference now to FIG. 3, additional details of the security element(s) 108 and their behavior in connection with illumination of the laminate structure 100 will be described in accordance with embodiments of the present disclosure. In the depicted embodiment, the core layer 304 comprises a first major surface and a second major surface. The first major surface of the core layer 304 interfaces with a lower surface of the first outer layer 308a to create a first reflective surface 304a. Similarly, the second major surface of the core layer 304 interfaces with an upper surface of the second outer layer 308b to create a second reflective surface 304b. The first and second reflective surfaces 304a, 304b may have the same size as the area of the laminate structure 100. In other words, the first and second reflective surfaces 304a, 304b may completely bound the core layer 304, thereby creating a light guide of sorts with the core layer 304.

Because the security element(s) 108 may correspond to a photoluminescent material (e.g., UV ink), when light impacts the security element(s) 108, the light will change its behavior and will, therefore, be viewable by an observer of an edge 308c, 308d of the laminate structure 100. More specifically, a light source 300 may provide illumination light 312 that enters an edge (e.g., a first edge 308c) of the laminate structure 100, or more accurately enters the core layer 304 via one of its exposed edges. Once the illumination light 312 enters the core layer 304, the illumination light 312 may impact or otherwise interact with a security element 108 within the core layer 304. Light 312 that impacts or interacts with the security element 108 may be re-radiated as re-radiated light 320 back toward the edge in which the light 312 entered the core layer 304. This re-radiated light 320 may be observed at the card edge (e.g., edge 308c and/or 308d) to provide a visual indication that the laminate structure 100 comprises the security element 108.

Light 312 which does not initially impact a security element 108 may continue to travel through the core layer 304, perhaps reflecting one or more times (e.g., becoming internal reflected light 316), before it finally exits the core layer 304. The light that eventually exits the core layer 304 may exit via a different edge (e.g., second edge 308d) of the laminate structure 100 or it may exit the same edge that originally received the illumination light 312 (e.g., first edge 308c). In some embodiments, the laminate structure 100 may correspond to a round or circular structure, in which case the laminate structure 100 may comprise a single continuous edge.

It should be appreciated that as the illumination light 312 travels through the core layer 304 it may either impact a security element 108 or not. Light which does not impact a security element 108 may simply be reflected by one or both of the reflective surfaces 304a, 304b. Some of the internal reflected light 316 may exit the core layer 204 without ever impacting a security element 108. This type of light cannot likely be used to verify the existence of the security element(s) 108 in the laminate structure 100. However, as discussed above, the light 312 which does impact a security element 108 may result in the production of re-radiated light 320 the security element 108. The re-radiated light 320 may comprise a plurality of wavelengths. More specifically, the light source 300 may emit light of a particular wavelength (e.g., UV, Infrared, etc.). Alternatively, the light source 300 may correspond to an ambient light source or some other source of white light. Thus, the illumination light 312 may have a first light property that is consistent with the light source 300.

The security element(s) 108 may alter one or more of the light properties and produce re-radiated light 320. As a non-limiting example, the re-radiated light 320 may exhibit a rainbow effect as it exits the core layer 304. In other embodiment, the security element(s) 108 may correspond to photoluminescent ink of multiple colors and the colors may switch or alternate across the edge of the core layer 304. As an example, the security element 108 printed on the core layer 304 may correspond to alternating deposits of green UV ink and blue UV ink such that some portions of the re-radiated light 320 may appear bluish when exiting the core layer 204 whereas other portions of the re-radiated light 320 may appear greenish when exiting the core layer 204. Continuing the above example, the blue UV ink may be positioned toward the middle of an edge of the core layer 304 whereas the ends of the security element 108 may comprise the green UV ink. In this example, the edge of the laminate structure 100 will exhibit a green-blue-green pattern of re-radiated light 320 when illuminated. Of course, any other color or combination of colors may be used for any one of the security elements 108 without departing from the scope of the present disclosure.

FIG. 3 also shows that some of the re-radiated light 320 may correspond to light 312 that first impacts a security element 108 and then immediately exits the core layer 304 whereas other portions of the re-radiated light 320 may correspond to light 312 that enters the core layer 304, reflects within the core layer 316, and then eventually impacts a security element 108 before exiting the core layer as re-radiated light 320. These different re-radiated lights 320 may appear the same or different to an observer of the laminate structure 100, especially depending upon how far the re-radiated light 320 has to travel within the core layer 304 before exiting and also depending upon whether that re-radiated light 320 further impacts another security element 108 before exiting the core layer 304.

With reference now to FIGS. 4 and 5, a method of manufacturing one or a plurality of laminate structures 100 will be described in accordance with embodiments of the present disclosure. The method begins when a sheet of material 420, corresponding to the core layer 304, is received (step 504). The initially-received sheet of material 420 may be considered a first intermediate product 404 in the manufacturing process.

The process continues with the establishment of one or more security elements 108 on the sheet of material 420 to result in a second intermediate product 408 (step 508). In some embodiments, the security element(s) 108 may correspond to photoluminescent ink, in which case the security element(s) 108 can be deposited on the sheet of material 420 via a printing process. If other materials are used for the security element(s) 108, then other deposition processes can be used such as thin film deposition techniques, Atomic Layer Deposition (ALD) techniques, screen printing, sputtering, tape cutting and placing, etc. Moreover, if the security element(s) 108 comprise a structural aspect, then the security element(s) 108 may be placed onto the sheet of material 420, adhered to the sheet of material 420, or the like. Although the security element(s) 108 are only shown as being deposited on a single side of the sheet of material 420, it should be appreciated that security element(s) 108 can be deposited on both sides of the sheet of material 420 either sequentially or simultaneously.

Thereafter, one or more outer sheets 424 are provided above and/or below the core layer 304 to result in a third intermediate product 412 (step 512). These outer sheets 424 may correspond to the outer layers 208a, 208b and 308a, 308b of the laminate structure 100 discussed herein. The third intermediate product 412 may comprise enough size to produce a plurality of individual laminate structures 100. In the example shown in FIG. 4, the third intermediate product 412 may produce sixteen individual laminate structures 416 which are also the same as laminate structure 100. It should be appreciated that a greater or lesser number of individual laminate structures 100 can be simultaneously obtained from the manufacturing process described and depicted herein.

Once the outer sheets 424 are positioned proximate the major surfaces of the core sheet 420, the process continues with lamination of the layers (step 516). Additionally, before or after step 516, an optional printing process may be performed where one or more images, words, holograms, etc. are printed on the exposed major surfaces of the outer sheets 424 (step 520). Of course, the printing (e.g., customization process) may be performed after each laminate structure 100 is cut from the third intermediate product 412 (step 524). The die cutting of the laminate structures 100 from the third intermediate product 412 may be performed using any known die cutting technique (e.g., machine cutting, laser cutting, etc.). In some embodiments, the laminate structures 416 are cut from the third intermediate product by cutting through or across the security element(s) 108 that have been printed. In other words, it may be desirable to cut through the security element(s) 108 to ensure that the security element(s) 108 are positioned at the outermost edge of the laminate structures 100, thereby exposing the security element(s) 108 via the edge of the laminate structure 100.

With reference now to FIG. 6, a method of authenticating or verifying the authenticity of a laminate structure 100 will be described in accordance with embodiments of the present disclosure. The method begins with a light source 300 providing illumination light 312 into the core layer 304 of a laminate structure 100 (step 604). The illumination light 312 may correspond to UV light, IR light, white light, ambient light, or combinations thereof. The illumination light 312 is introduced into the core layer 304 via one or more edges 308c, 308d of the laminate structure 100.

The process continues with the observation of light emanating from the core layer 304 (step 608). The emanating light 320 also exits via one or more edges 308c, 308d of the laminate structure 100 and it may or may not exit via the same edge that received the illumination light 312. The process continues by determining whether any of the emanating light 320 has a different characteristic or is otherwise visibly different from the illumination light 312. This determination may help determine whether the illumination light 312 impacted or encountered a security element 108 while it was reflecting within the core layer 304. As an example, if the edge of the laminate structure 100 appears to have a rainbow hue or alternating colors that correspond to the alternating colors of the security element(s) 108 provided on the core layer 304, then the determination can be made that the laminate structure 100 is authentic (step 616). If, on the other hand, the observed light has not changed relative to the illumination light 312, then the laminate structure 100 may be determined to be a counterfeit, forgery, or not authentic (step 616).

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A secure laminate, comprising:
    a core layer comprising at least one of a transparent and translucent material including:
    a first major surface;
    a second major surface opposing the first major surface; and
    at least one edge connecting the first and second major surfaces;
    a second layer adjacent to and directly contacting the first major surface of the core layer, wherein the second layer is an opaque sheet of plastic or polymer;
    a third layer adjacent to and directly contacting the second major surface of the core layer, wherein the third layer is an opaque sheet of plastic or polymer; and
    a first security element comprising a photoluminescent material laminated between the core layer and the second layer;
    wherein the second layer and third layer reflect luminescent light emitted by the first security element such that the presence of the security element can be checked by illuminating the at least one edge and viewing the re-radiated luminescent light emerging from the core layer through the at least one edge.

2. The secure laminate of claim 1, wherein the photo luminescent material comprises an ultraviolet fluorescent material.

3. The secure laminate of claim 1, wherein the material of the core layer transmits at least one of ultraviolet light, visible light, and infrared light.

4. The secure laminate of claim 1, wherein the material of the core layer comprises clear polycarbonate.

5. The secure laminate of claim 1, wherein the photoluminescent material forms a layer that is substantially co-planar with the first major surface.

6. The secure laminate of claim 5, wherein the layer of photoluminescent material is aligned with the at least one edge of the core layer.

7. The secure laminate of claim 1, wherein the photoluminescent material is printed on at least one of the first major surface of the core layer and a first surface of the second layer positioned adjacent to the first major surface.

8. The secure laminate of claim 1, wherein a second security element comprising a photoluminescent material is laminated between the core layer and the third layer.

9. The secure laminate of claim 8, wherein the second security element is positioned to substantially align with the position of the first security element on opposite sides of the core layer.

10. The secure laminate according to claim 1, wherein the photoluminescent material of the second security element is printed on at least one of the second major surface of the core layer and a first surface of the third layer positioned adjacent to the second major surface.

11. The secure laminate of claim 1, wherein the secure laminate is a card.

12. The secure laminate of claim 1, wherein the photoluminescent material of the first security element comprises photoluminescent ultraviolet ink of multiple colors and re-radiates light of multiple colors that switch or alternate across the at least one edge of the core layer.

13. The secure laminate of claim 12, wherein the photoluminescent ultraviolet ink re-radiates a rainbow pattern visible at the at least one edge of the core layer.

14. The secure laminate of claim 12, wherein the photoluminescent ink comprises green ultraviolet ink and blue ultraviolet ink and wherein the re-radiated light that exits the at least one edge of the core layer comprises greenish portions and bluish portions.

15. The secure laminate of claim 8, wherein the first and second security elements comprise the same photoluminescent ultraviolet ink.

16. A secure laminate, comprising:
    a core layer comprising at least one of a transparent and translucent material including:
    a first major surface;
    a second major surface spaced from the first major surface; and
    an edge extending between the first and second major surfaces;
    a second layer having a first surface comprising a reflective material disposed thereon and positioned in contact with the first major surface of the core layer;
    a third layer having a first surface comprising a reflective material disposed thereon and positioned in contact with the second major surface of the core layer;
    at least one security element comprising a photoluminescent material positioned between the core layer and at least one of the second and third layers;
    a light guide formed at the interface between the second layer and the first major surface and the interface between the third layer and the second major surface;
    wherein, when at least a portion of the edge is illuminated by a first light, at least a second light will be emitted from the at least one security element and reflected by the light guide to the edge, the second light is visibly different from the first light.

17. The secure laminate of claim 16, wherein the second and third layers are opaque to the emitted light from said security element.

\* \* \* \* \*